US008413529B2

(12) United States Patent
Carkner

(10) Patent No.: US 8,413,529 B2
(45) Date of Patent: Apr. 9, 2013

(54) REUSABLE BLOOD SPECIMEN TRANSFER DEVICE

(76) Inventor: Steve Carkner, Ottawa (CA)

( * ) Notice: Subject to any disclaimer, the term of this patent is extended or adjusted under 35 U.S.C. 154(b) by 332 days.

(21) Appl. No.: 12/830,393

(22) Filed: Jul. 5, 2010

(65) Prior Publication Data

US 2011/0023634 A1 Feb. 3, 2011

Related U.S. Application Data

(60) Provisional application No. 61/230,726, filed on Aug. 2, 2009.

(51) Int. Cl.
*G01N 1/20* (2006.01)

(52) U.S. Cl.
USPC ........................................................ 73/863.81

(58) Field of Classification Search .................. 604/240, 604/241, 411, 110, 164.08, 193, 197, 263, 604/905; 73/863.81, 864.13; 422/501
See application file for complete search history.

(56) References Cited

U.S. PATENT DOCUMENTS

| | | | | |
|---|---|---|---|---|
| 4,742,910 | A * | 5/1988 | Staebler | 206/365 |
| 5,542,927 | A * | 8/1996 | Thorne et al. | 604/110 |
| 2001/0000793 | A1* | 5/2001 | Daubert et al. | 604/200 |
| 2004/0111067 | A1* | 6/2004 | Kirchhofer | 604/240 |

* cited by examiner

*Primary Examiner* — Peter Macchiarolo
*Assistant Examiner* — Tamiko Bellamy
(74) *Attorney, Agent, or Firm* — Gordon Thomson

(57) ABSTRACT

A blood transfer assembly comprises of a standard Luer lock style syringe that has a needle and a protective cap in place. The assembly further comprises a blood transfer guide housing that contains a first optional set of barbs that holds the cylindrical end of the syringe. A second set of barbs rigidly hold the needle and prevent the needle being withdrawn from the guide. As the syringe is inserted into the guide the protective cap will pass through the first and second set of barbs until the syringe and the guide come in mechanical contact with each other forming a single assembly.

1 Claim, 3 Drawing Sheets

REUSABLE BLOOD SPECIMEN TRANSFER DEVICE

CROSS REFERENCE TO RELATED APPLICATIONS

This application claims the benefit of U.S. Provisional Patent Application No. 61/230,726 filed on Aug. 2, 2009.

FEDERAL FUNDING

N/A.

FIELD OF THE INVENTION

This invention relates to field of surgery and particularly to containers for the transfer of blood and specifically to a reusable blood specimen transfer device.

BACKGROUND OF THE INVENTION

Testing blood and other liquids is standard practice in assessment of health and wellbeing. The systems and methods for drawing blood from a patient are well understood and generally result in blood being drawn and stored in either a syringe or an evacuated glass vial commonly called a specimen vial.

A number of methods exist for transferring blood back and forth between a syringe and a vial. Most commonly, healthcare workers simply penetrate the rubber vial cap with a syringe that has a needle affixed to the standard Luer lock connector thereon. A major identified disadvantage of such a method is the high risk of the healthcare worker accidentally pricking themselves with the needle and potentially contracting disease from such needle prick.

Several safer blood transfer guides have been suggested that reduce the probability of needle pricks, however a common difficulty encountered with these transfer devices is the need to sterilize such devices. U.S. Pat. No. 5,360,423 is one such example of a blood transfer device wherein a Luer lock and needle assembly is permanently mounted on a guide collar. A syringe can be connected to the Luer lock while a vial is pushed into the collar assembly such that the needle penetrates the rubber cap affixed to the vial. Such assembly must be kept sterile until ready to use, and once used must be disposed of.

A further disadvantage of fixed-needle blood transfer devices is the severe limitation this places on labs that require different needle sizes to be used. With a fixed needle in place a different blood transfer device must be used for each individual desired needle size.

There exists a need for a blood transfer device that can accept a variety of syringes with a variety of needle sizes already attached thereon. There further exists a need for a blood transfer device that does not require sterilization

SUMMARY OF THE INVENTION

In a preferred embodiment of the invention there is provided a means for accepting a syringe that has a needle assembly with protective cap already attached to the Luer lock. This is the normal condition a syringe with needle would be found in, such that the needle itself is protected by a small plastic cap.

The syringe assembly is inserted into a guide that holds the syringe removeably by the cylinder that normally surrounds the Luer lock mechanism. Since this cylinder size may vary slightly from syringe to syringe, the guide is designed to flex slightly in an interference fit with said cylinder.

As the syringe is passed into the blood transfer guide assembly, the protective cap on the needle passes a set of barbs that will not allow the needle to be removed. The protective cap further penetrates into a barb assembly that is part of a removable handle in the overall assembly. The healthcare worker can then pull the handle away from the blood transfer device which acts to also remove the protective cap from the needle, exposing the needle inside a protective guide that is sized to receive a specimen vial.

The specimen vial is pushed onto the exposed needle which then allows blood or other fluids to be moved between the syringe and the vial.

Once the transfer is completed the vial may be withdrawn from the assembly, and the handle, still holding the protective cap from the needle may optionally be replaced on the assembly.

The syringe may be optionally removed from the assembly by twisting counter-clockwise to dis-engage the Luer lock from the needle assembly which will remain inside the blood transfer guide, held by the barb assembly.

The assembly may be disposed of, or the needle may be ejected into a sharps collection container by pushing it through the assembly past the barbs using a simple push rod or other tool (not shown). It is expected that the blood transfer assembly would be washed between uses, but would not need a full sterilization cycle as no elements of the remaining assembly would come in contact with fluids from the next sample being processed.

While it is a goal of the invention to enable reusability of the product, the fact that sterilization is not needed from the factory is itself a benefit in reducing manufacturing costs and in reducing the chances of contamination that exists if a small hole develops in the packaging of existing sterilized blood transfer devices.

DETAILED DESCRIPTION

Figure 1:
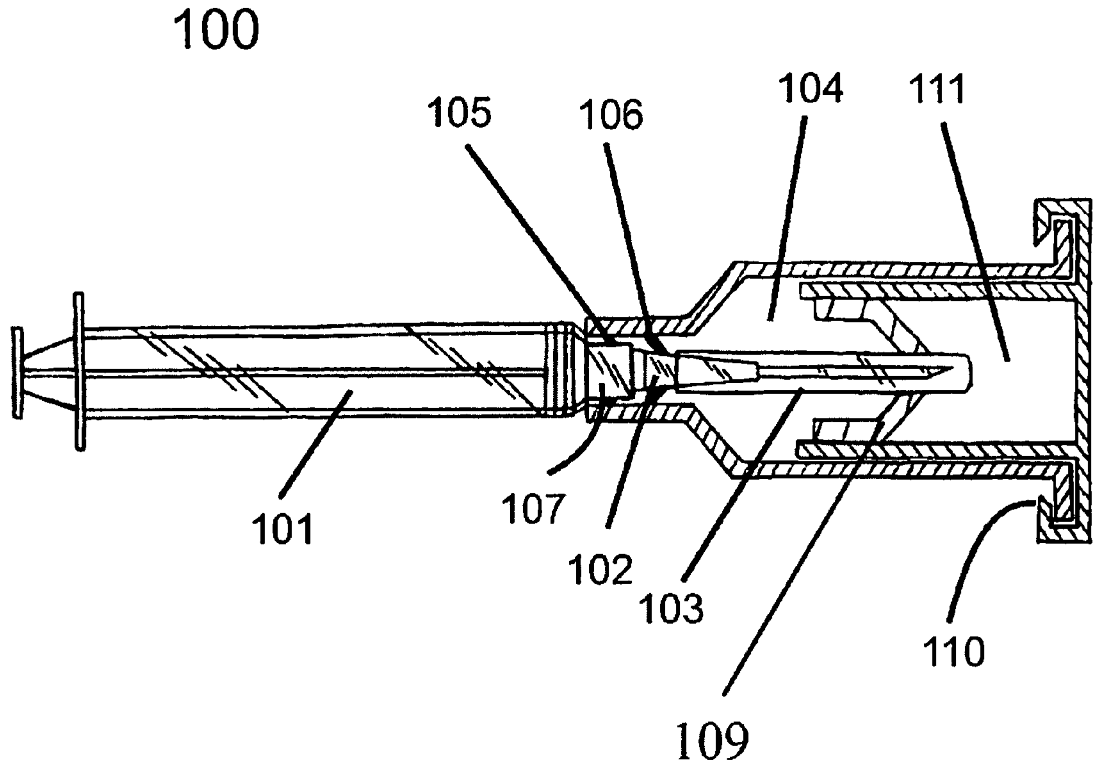
FIG. 1 is a drawing of a complete transfer assembly with syringe inserted.

Referring to FIG. 1, the complete blood transfer assembly (100) is shown. It is composed of a standard Luer lock style syringe (101) that has a needle (102) attached with a protective cap (103) in place. This Luer lock syringe/needle/cap assembly is commonly available from sizes of 3 ml up to about 150 ml. The needles are available in a variety of gages and lengths with Luer lock fittings that are compatible between any syringe size. This provides great flexibility in choosing the right syringe/needle combination for any need. The blood transfer guide housing (104) contains a first set of barbs (105) that holds the cylindrical end (107) of the syringe. The diameter of this cylinder is somewhat variable and is designed mainly to protect the Luer fitting itself (not shown). The first set of barbs (105) is optional, they may be designed to hold the syringe permanently in applications where it is desired to dispose of the syringe along with the transfer assembly. Alternatively the barbs may be designed to hold the syringe in a removable way, or may be eliminated altogether with the guide instead being designed as an interference fit with the cylinder to provide mechanical rigidity between the syringe (101) and the guide (104).

The guide (104) further contains a second set of barbs (106) which are required in all cases. These rigidly hold the needle and prevent the needle being withdrawn from the guide. As the syringe (101) is inserted into the guide (104) the protective cap (103) will pass through both sets of barbs (105, 106) until the syringe and the guide come in mechanical contact with each other forming a single assembly.

The blood transfer assembly (100) includes a protective handle (111). The handle includes a barb assembly (109) that can be constructed from soft rubber, metal fingers or another material. As the syringe (101) is pushed into the guide (104) the protective cap (103) on the needle (102) will be pushed through this barb assembly (109) and held. The construction of the barb assembly (109) will determine if the cap is held in a way that allows removal, or if it is permanently held. The protective handle (111) includes an overlapping thread or interlock (110) that maintains its axial position with respect to the guide (104) while the syringe (101) is being slid into place. Once the assembly (100) of all elements is completed as shown in the diagram in completed form, the protective handle (111) can be turned to disengage the interlock (110) which allows the handle to be removed from the assembly. This causes the needle cap (103) to be removed and exposes the needle (102) itself.

The assembly (100) of FIG. 1 contains three sterile elements. The syringe (101), the needle (102) and the needle cap (103) are all sterile elements. These are all standard elements that can be purchased from a variety of suppliers in a variety of sizes, but all containing a common element of the Luer lock cylindrical end (107). The remaining elements in the figure do not require sterilization as they do not come in contact with any specimens at any time in the blood transfer process.

Figure 2:
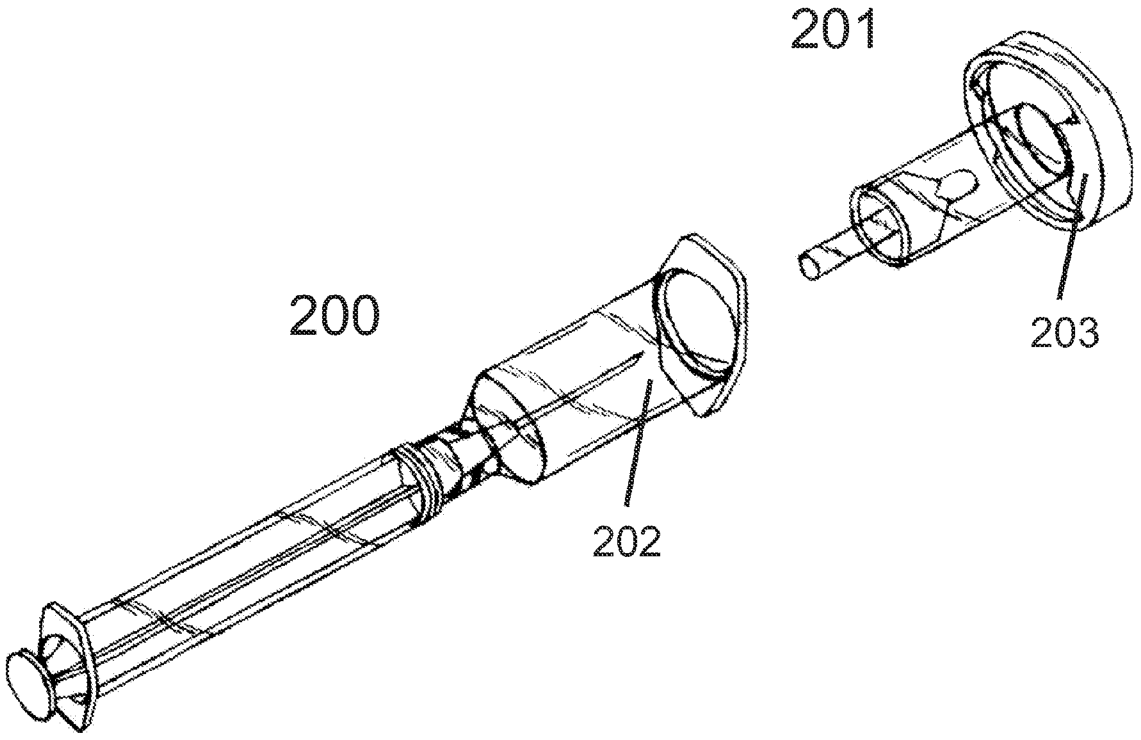
FIG. 2 is a perspective drawing of the assembly ready to receive a specimen vial.

A perspective view of the assembly is shown in FIG. 2. The blood transfer device (200) is ready to have a specimen vial inserted into the guide (202). The protective handle assembly (201) has been withdrawn and retains the protective cap from the needle. An interlock (203) can be seen on the protective handle which requires the handle (201) to be twisted before removal from the blood transfer assembly (200).

Figure 3:
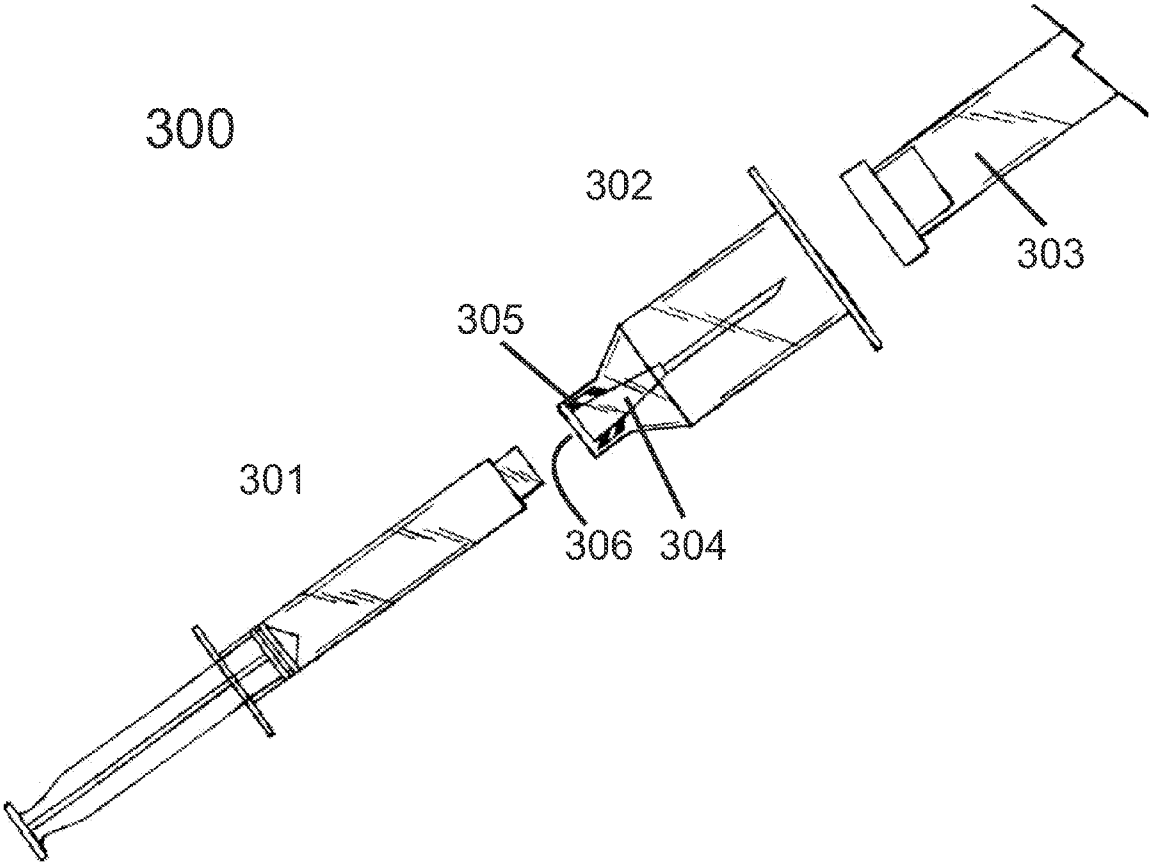
FIG. 3 is a drawing of the syringe and vial removed from a used assembly.

FIG. 3 shows elements of the blood transfer assembly (300) after use. The syringe (301) has been removed from the specimen guide (302) by twisting it from the Luer lock on the needle (304). The barbs (305) may be designed to prevent removal of the syringe (301) if desired in the end application.

The specimen vial (303) is removed by simply pulling it off the needle (304) and out of the guide assembly (302).

If it is desired to reuse the guide assembly then the needle (304) can be ejected from the guide (302) by use of a push rod or other instrument through the syringe opening (306) which causes the needle to pass through the barbs and fall safely out of the guide (302) into a sharps handling container (not shown). The protective handle assembly (not shown) can then be reattached to the guide, enabling the entire system to be reused.

Although the description above contains much specificity, these should not be construed as limiting the scope of the invention but as merely providing illustrations of the presently preferred embodiment of this invention. Thus the scope of the invention should be determined by the appended claims and their legal equivalents.

What is claimed is:

1. A specimen transfer system allowing fluid to be passed between a vial and a syringe or vice versa and including: an open end sized to accept a Luer lock style syringe that has a needle and protective cap preinstalled; a first barb assembly sized to hold the needle in place; a handle assembly which further comprises a second barb assembly sized to hold the needle protective cap; said handle assembly removable from the transfer system such that the protective cap is removed from the needle and allowing a specimen vial to then be placed onto the needle; wherein the transfer system contains no sterilized elements until a syringe containing a needle and protective cap is inserted into the system and wherein a third barb assembly is included to capture the cylindrical end of the syringe in a non-removable way.

* * * * *